United States Patent [19]

Petrovic

[11] Patent Number: 4,611,615

[45] Date of Patent: Sep. 16, 1986

[54] FLUID TREATMENT APPARATUS AND METHOD

[76] Inventor: Ljubisa M. Petrovic, 15918 Mission Village Dr., Houston, Tex. 77083

[21] Appl. No.: 547,833

[22] Filed: Nov. 2, 1983

[51] Int. Cl.$^4$ .................. B01D 35/06; F02M 27/00
[52] U.S. Cl. ................................. 137/13; 137/809; 137/833; 123/538; 210/222; 210/695
[58] Field of Search ............... 137/13, 803, 809, 833, 137/561 A; 123/536; 210/222, 695

[56] References Cited

U.S. PATENT DOCUMENTS

| | | | |
|---|---|---|---|
| 1,637,697 | 7/1927 | Jacobsen | 366/336 |
| 2,740,616 | 4/1956 | Walden | 259/4 |
| 2,825,464 | 3/1958 | Mack | 210/222 |
| 3,228,868 | 1/1966 | Ruskin | 210/222 |
| 3,669,274 | 6/1972 | Happ et al. | 210/222 |
| 3,680,705 | 8/1972 | Happ et al. | 210/222 |
| 3,689,033 | 9/1972 | Holmstrom et al. | 259/5 |
| 3,860,217 | 1/1975 | Grout | 259/4 |
| 3,923,660 | 12/1975 | Kottmeier | 210/222 |
| 3,951,807 | 4/1976 | Sanderson | 210/222 |
| 4,054,270 | 10/1977 | Gugger et al. | 366/143 |
| 4,146,479 | 3/1979 | Brown | 210/222 |
| 4,153,559 | 5/1979 | Sanderson | 210/222 |
| 4,189,243 | 2/1980 | Black | 366/336 |
| 4,216,092 | 8/1980 | Shalhoob et al. | 210/222 |
| 4,278,549 | 7/1981 | Abrams et al. | 210/695 |
| 4,289,621 | 9/1981 | O'Meara, Jr. | 210/222 |
| 4,299,700 | 11/1981 | Sanderson | 210/222 |
| 4,320,003 | 3/1982 | Sanderson et al. | 210/222 |
| 4,357,237 | 11/1982 | Sanderson | 210/222 |
| 4,366,053 | 12/1982 | Lindler | 210/222 |
| 4,372,852 | 2/1983 | Kovacs | 210/222 |
| 4,417,984 | 11/1983 | O'Meara, Jr. | 210/695 |

OTHER PUBLICATIONS

Superior Water Conditioner Sales Information, Jun. 20, 1979.
Global Engineered Sales Information, Jun. 1979, Houston, Texas.
CPS Industries, Inc. Brochure, Jun. 1982.

Primary Examiner—A. Michael Chambers
Attorney, Agent, or Firm—Arnold, White & Durkee

[57] ABSTRACT

A fluid treatment apparatus and method for preventing or removing the formation of paraffin, scale, salt encrustation, emulsion, and the like on the interior surface of a conduit carrying a fluid. The fluid treatment apparatus comprises a turbulent flow generator, a plurality of support cylinders inside the apparatus, symmetrically opposed lower and upper flow distribution holes in the support cylinders, a plurality of permanent magnets within the support cylinders oriented with adjacent magnets having the opposite polarity, magnetic field intensification disks disposed between each magnet, and two magnetic field closure rings engaged with the support cylinders for securing the position of the cylinders and magnets and for closing and concentrating the magnetic fields at both extremities of the plurality of magnets. The method for preventing or removing the formation of paraffin, scale, salt encrustation, emulsion, and the like from the interior surface of a conduit transferring a fluid consisting of inducing the turbulent flow of the fluid with the conduit, subjecting the fluid to a plurality of magnetic fields, and inducing further the turbulent flow of the fluid within the conduit.

22 Claims, 8 Drawing Figures

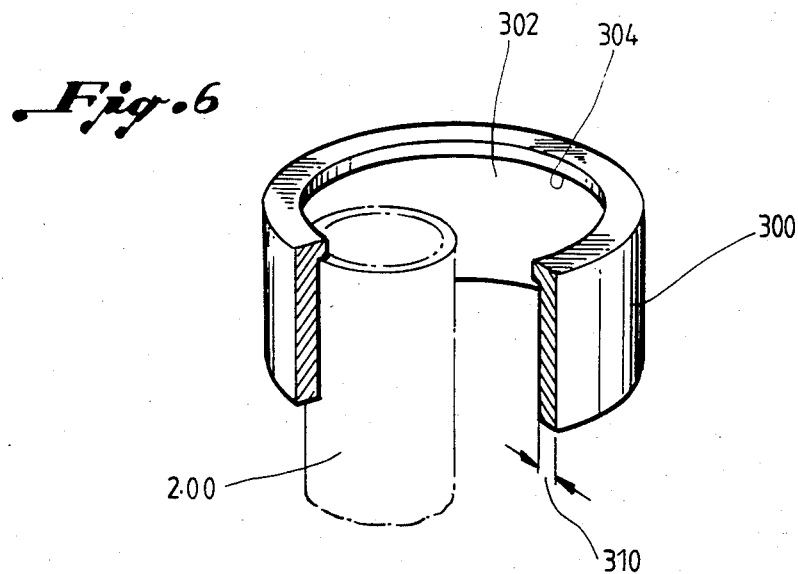
Fig. 6
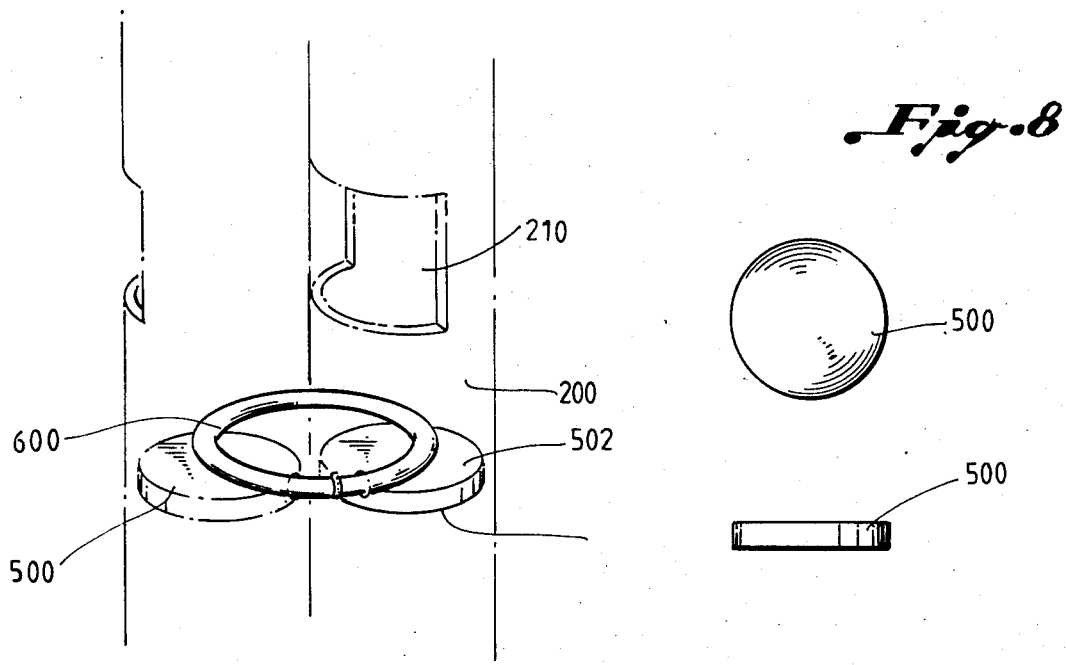
Fig. 8
Fig. 7

FLUID TREATMENT APPARATUS AND METHOD

BACKGROUND OF THE INVENTION

The present invention relates generally to fluid flow in restricted areas and specifically to removing, reducing or preventing the build-up of paraffin, scale and salt encrustation at the fluid-structure interface as well as preventing emulsion problems.

The transfer of fluids through conduits or pipes causes numerous problems. One such problem is the adhesion of undesirable materials to the interior surface of the conduit. The problem of unwanted material adhering to the interior surface of a conduit transferring a fluid is critical because the inside diameter of the conduit decreases to restrict and can eventually prohibit flow therethrough. The phenomena of reducing flow in conduits is present at all stages of the transfer of petroleum products, i.e., removal from the earth formation to utilization by the end user.

Of primary concern, due to the extremely hostile environment, is the removal of the raw petroleum products from the earth formations. The tubing, pumps, and other equipment used downhole when petroleum products are being extracted from the earth formation are extremely susceptible to the adhesion of undesirable material on their surface. The adhesion problem is exaggerated in oil wells due to the extremely harsh physical and chemical characteristics of the environment in which the equipment is placed. The materials of primary concern are paraffin, scale, salt encrustation, and emulsions.

Paraffin accumulation on the surface of a conduit carrying petroleum products is of critical importance. The build-up of paraffin on surfaces has typically been prevented or removed by heating the surface or by scraping the surface. Typically, the conduit surface is heated by the injection of a hot fluid in the vicinity of the conduit and is scraped by the insertion of a wire-scraping device into the conduit. It has been found to be extremely expensive to utilize thermal or mechanical techniques to prohibit or remove paraffin build-up on the interior surfaces of a conduit carrying petroleum products. Thermal methods of preventing the formation of paraffin build-up require special expensive equipment and additional manpower. Most significantly thermal methods are quite expensive due to the lost production time incurred. Mechanical techniques for controlling and removing paraffin are cumbersome and expensive. Both direct costs and lost production time contribute to the expense of mechanically removing or controlling paraffin in a conduit carrying petroleum products.

In the past, scale build-up has been removed by chemical and mechanical methods. Chemical methods require the use of extremely strong and reactive substances such as hydrochloric acid. The highly reactive substances are then required to be extracted from the primary fluid being transferred. Mechanical methods for controlling and removing scale build-up are not effective and tend to cause additional problems. Scale build-up is typically removed from the walls by a "chipping" process which is not effective, reduces production time and increases costs.

The encrustation of salt on the interior surfaces of conduits carrying petroleum products is also a major problem. Salt encrustation has typically been controlled or removed by chemical and mechanical methods. The chemical and mechanical methods for the removal of salt encrustation have similar problems as the chemical and mechanical methods for the removal of scale. However, salt encrustation can be removed by injecting fresh water, eliminating the concern for using strong, reactive substances such as hydrochloric acid.

Emulsions are an acute problem in the transfer of petroleum products through conduits. Emulsion problems are exacerbated when extracting petroleum products from earth formations due to the hostile environment which includes but is not limited to heat, pressure and pH. Oil wells provide a system having different liquids dispersed in an immiscible liquid. The different liquids tend to stabilize, reduce the flow rate and inhibit production. Attempts to remedy emulsion problems have usually been directed toward thermal treatment on the surface or chemical treatment on the surface and downhole. Thermal techniques are expensive and cumbersome since the technique requires special equipment, additional manpower and reduces production time. Also, chemical methods have been used to prevent emulsifier action in conduits carrying petroleum products. Generally, chemical methods are used to disassociate the components of the emulsified fluid. As with the problems of scale build-up and salt encrustation, chemical methods tend to cause many complications that are as difficult to remedy as the emulsion problem to be solved.

All of the prior methods for preventing the build-up of paraffin, scale and salt, as well as preventing the emulsion problems are costly. The extreme cost is compounded by the direct expense of implementing the thermal, chemical, and mechanical techniques as well as the indirect expense associated with lost production time.

There is thus a need for a fluid treatment apparatus and method which prevents or reduces emulsion problems and the build-up of paraffin, scale and salt in conduits carrying fluids, which does not obstruct or inhibit the flow of the fluid, which is readily implemented in conjunction with the conduit, and which is inexpensive.

It is, therefore, a feature of the present invention to provide a fluid treatment apparatus and method for preventing and reducing emulsion problems and the build-up of material on surfaces in contact with a fluid utilizing magnetohydrodynamic principles.

It is a more particular feature of the present invention to provide a fluid treatment apparatus and method for preventing and reducing emulsion problems and the build-up of material on surfaces in contact with a fluid, utilizing what may be magneto-chemical effects to create an environment produced by the application of magnetic fields to turbulent fluid that inhibits or reduces the undesirable flow characteristics.

Another feature of the present invention is to provide a fluid treatment apparatus for preventing and reducing emulsion problems and the build-up of material on surfaces in contact with a fluid having a self-contained energy cell and requiring no external source of power.

Yet another feature of the present invention is to provide a fluid treatment apparatus for preventing and reducing emulsion problems and the build-up of material on the surface of a conduit in contact with a fluid that is easy to install and when installed can be a permanent part of the conduit.

Still another feature of the present invention is to provide a fluid treatment apparatus for preventing and reducing emulsion problems and the build-up of material on surfaces in contact with a fluid which has no moveable parts.

Yet still another feature of the present invention is to provide a fluid treatment apparatus for preventing and reducing emulsion problems and the build-up of material on the interior surfaces of a conduit in contact with a fluid which requires no maintenance.

Yet still another feature of the present invention is to provide a fluid treatment apparatus for preventing and reducing emulsion problems and the build-up of material on the interior surfaces of a conduit in contact with a fluid which is highly durable and which utilizes standard sizes and configurations to be easily adapted to any standard size equipment.

Additional features and advantages of the invention will be set forth in part in the description which follows and in part will become apparent from the description, or may be learned by practice of the invention. The objects, features, and advantages of the invention may be realized and obtained by means of the instrumentalities, combinations, and steps particularly pointed out in the appended claims.

SUMMARY OF THE INVENTION

To achieve the foregoing objects, features, and advantages, and in accordance with the purposes of the invention as embodied and broadly described herein, a fluid treatment apparatus is provided for preventing and reducing emulsion problems and the build-up of material on the interior surface of a conduit in contact with a fluid which comprises: an exterior structure, a top connector, a bottom chamber, the top connector and the bottom chamber adaptable to affix the apparatus into the conduit, a turbulent flow generator inside the bottom chamber, a plurality of support cylinders inside the exterior structure held in their respective orientations primarily by upper and lower rings therethrough, each support cylinder having one or more lower flow distribution holes and one or more upper flow distribution holes, the upper and the lower flow distribution holes in each support cylinder being symmetrically oriented, a plurality of permanent magnets within the support cylinders oriented with adjacent magnets having the same polarity, a plurality of magnetic field intensification disks disposed adjacent the ends of each magnet in the support cylinders, and two magnetic field closure rings engaged with each support cylinder for securing the position of the cylinders and magnets and for closing and concentrating the magnetic field at both extremities of the plurality of magnets.

Generally, the apparatus of the present invention comprises means for inducing the turbulent flow of the fluid within the structure, means for subjecting the fluid to a plurality of magnetic fields and means for further inducing the turbulent flow of the fluid within the structure.

It is preferable that the means for inducing turbulent flow include an obstruction associated with the interior surface of the apparatus having one or more chambers through which the fluid must pass. Any hydraulic trip operationally associated with the structure would be sufficient to induce turbulent flow, e.g., a baffle. An appropriate hydraulic trip would be a surface disposed across the cross-sectional area of the conduit, having one or more apertures through which the fluid can pass.

Preferably, the means for subjecting the fluid to a plurality of magnetic fields includes passing the fluid in the vicinity of a plurality of permanent magnets. Also, it is preferable that the magnets be aligned with the same polarity abutting. The magnets can be aligned in a single linear orientation inside a single support cylinder or in adjacent linear groups inside a plurality of support cylinders.

It is also preferred that the means for further inducing the turbulent flow of fluid within the structure comprises a device for changing the direction of the fluid inside the conduit. Such a device may include a plurality of cylinders having parallel central axes and abutting exterior walls. Each cylinder may have an aperture near each end with the apertures in each cylinder on opposite sides. The cylinders would be aligned to have the associated aperture at each of the respective ends of the cylinders opening symmetrically away from an adjacent aperture.

Of independent significance, the present invention comprises a fluid treatment method for preventing and reducing emulsion problems and the build-up of material on the interior surfaces of a conduit in contact with a fluid comprising: inducing the turbulent flow of the fluid within the conduit; subjecting the fluid to a plurality of magnetic fields; and further inducing the turbulent flow of the fluid within the conduit.

In preferred form, inducing turbulent flow includes hydraulically tripping the fluid within the structure. An appropriate hydraulic trip would comprise an obstruction in the flow of the fluid within the conduit. Alternately, inducing turbulent flow within the conduit can include changing the direction of the flow of the fluid within the conduit.

Preferably, the method comprises subjecting the fluid to a plurality of magnetic fields with each successive field alternating in polarity.

BRIEF DESCRIPTION OF THE DRAWINGS

The accompanying drawings, which are incorporated in and constitute a part of the specification, illustrate a preferred embodiment of the invention and, together with the general description of the invention given above and the detailed description of the preferred embodiment given below, serve to explain the principles of the invention.

FIG. 6 is a sectional, perspective view of a preferred embodiment of the present invention illustrating the orientation of the support cylinder and the support ring;

FIG. 7 is a sectional, perspective view of a preferred embodiment of the present invention illustrating the orientation of the support cylinders, the magnetic field intensification disks, and the magnetic field closure ring; and FIG. 8 is a plan and elevation view of the magnetic intensification disk used in the preferred embodiment of the present invention.

The above general description and the following detailed description are merely illustrative of the generic invention; and additional modes, advantages, and particulars of this invention will be readily suggested to those skilled in the art without departing from the spirit and scope of the invention.

DESCRIPTION OF THE PREFERRED EMBODIMENT

References will now be made in detail to the present preferred embodiment of the invention as described in the accompanying drawings.

The preferred embodiment of the present invention utilizes magnetohydrodynamics and the related phenomena arising from the motion of fluids in the presence of magnetic fields. The combination of hydrodynamic and magnetic forces creates what appears to be magneto-chemical reactions. The magnetochemical reactions are effective in controlling emulsion problems and the build-up of paraffin, scale, and salt encrustation on the surfaces of producing oil wells and the like in contact with petroleum and petroleum products.

Specifically, the magnetic fields and the hydrodynamic forces cause intra-molecular vibrations within the fluid as well as within the paraffin, scale, and salt. The intra-molecular vibrations are sufficient to reduce the molecular attraction by which the individual particles of different elements are united. The reduction in the cohesive properties of the different substances reduces the adhesive forces between the paraffin, scale, salt and emulsion products and the well components.

Figure 1:
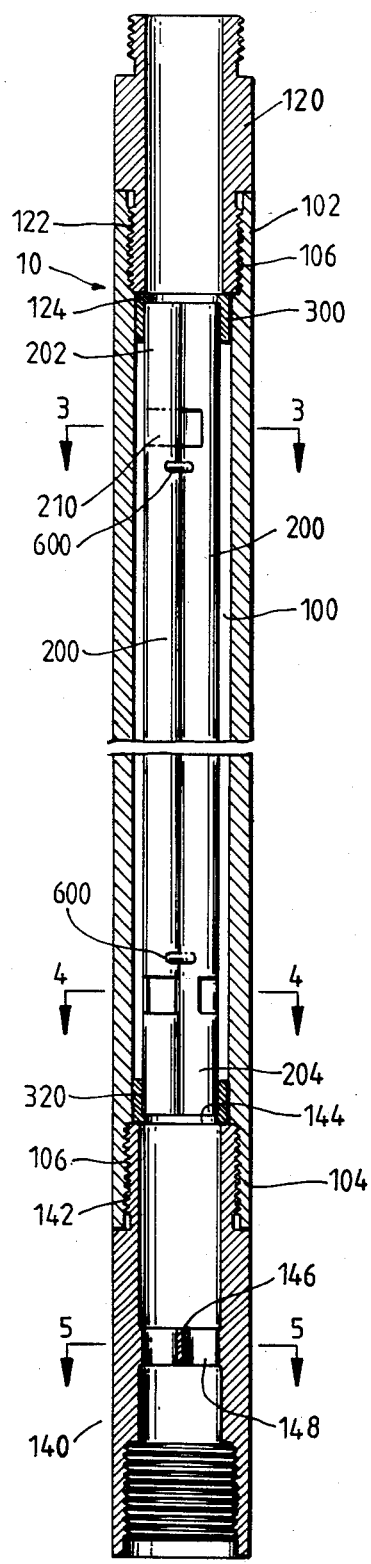
FIG. 1 is a perspective, sectional view of a preferred embodiment of the present invention.

In FIG. 1 there is shown a sectional view illustrating a preferred embodiment of the fluid treatment appartus 10 of the present invention. The fluid treatment apparatus 10 comprises the exterior structure 100, the top connector 120, the bottom chamber 140, a plurality of support cylinders 200, an upper and lower support ring 300 and 320, respectively, a plurality of permanent magnets 400 (see FIG. 2), the magnetic field intensification disks 500 (see FIG. 2), and the magnetic field closure rings 600.

The exterior structure 100 has an upper end 102 and a lower end 104. In the upper end 102 and lower end 104 the interior surface of the structure 100 has projecting helical ribs 106 and 108, respectively. The projecting helical ribs 106 in the upper end 102 of the structure 100 engage the projecting helical ribs 122 on the exterior of the top connector 120. The top connector 120 is adapted to engage the fluid treatment apparatus 10 with the upper conduit through which the fluid flows. The projecting helical ribs 106 in the lower end 104 of the structure 100 engage the projecting helical ribs 142 in the upper end of the bottom chamber 140. The bottom chamber 140 is adapted to engage the fluid treatment apparatus 10 with the lower conduit through which the fluid flows.

FIG. 1 shows the support cylinders 200 inside the exterior structure 100. The support cylinders 200 are held in place by the upper support ring 300 and the lower support ring 320. The upper support ring 300 fits around the upper ends 202 of the support cylinders 200 and abuts the inner surface of the exterior structure 100. The top of the upper support ring 300 rests on the lower end 124 of the top connector 120. The lower support ring 320 fits around the lower ends 204 of the support cylinders 200. The lower support ring 320 abuts the interior surface of the structure 100. The lower support ring 320 engages the upper end 144 of the bottom chamber 140. Additionally, the support cylinders 200 are held together by the magnetic field closure rings 600.

Figure 2:
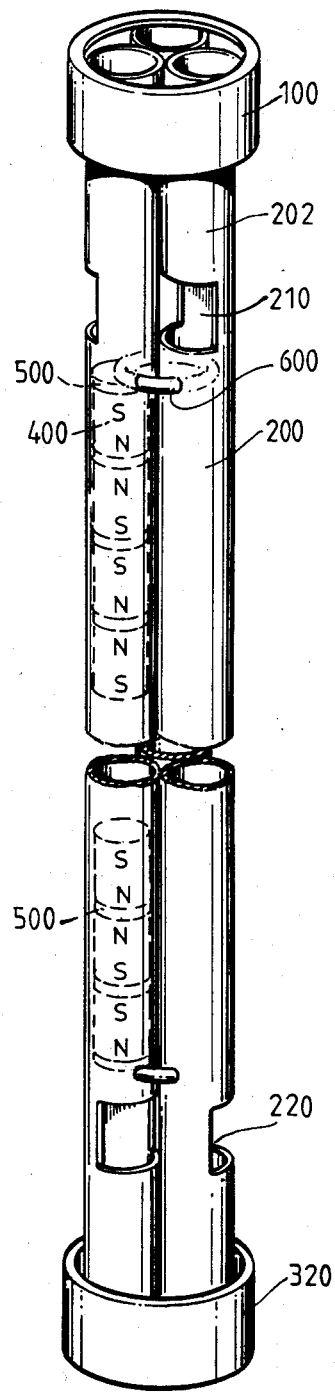
FIG. 2 is an axonometric projection of a preferred embodiment of the present invention.

FIG. 2 is a perspective, axonometric projection of the assembly of parts of the fluid treatment apparatus 10 enclosed within the structure 100 and the top connector 120 and the bottom chamber 140. The preferred embodiment of the control apparatus as illustrated in FIG. 2 utilizes three support cylinders 200. The support cylinders 200 are aligned with their central axes parallel. The support cylinders 200 have dimensions of identical size. The support cylinders 200 are secured together with their exterior walls abutting by the upper support ring 300, the lower support ring 320, and the magnetic field closure rings 600.

As illustrated in FIG. 2, a plurality of permanent magnets are inserted into each support cylinder 200. The permanent magnets 400 are oriented to place the same polarity adjacents the next magnet. Interspaced above and below each permanent magnet 400 is a magnetic field intensification disk 500. The permanent magnets 400 and the magnetic field intensification disks 500 are aligned in each of the three support cylinders 200 in an identical configuration. The permanent magnets and the magnetic field intensification disks 500 are secured within the support cylinders 200 by the magnetic field closure ring 600.

The magnetic field closure ring 600 is a torus-shaped element. The magnetic field closure ring 600 serves two purposes. First, the magnetic field closure ring 600 acts as a structural support for the support cylinders 200 and the permanent magnets 400. The magnetic field closure rings 600 secure the relative position of the support cylinders 200 as well as the permanent magnets 400 therein. Second, the magnetic field closure rings operate to confine the magnetic field in the upper extremities and lower extremities of the control apparatus 10. Thus, the magnetic field closure rings 600 act to concentrate the magnetic field at the longitudinal extremities of the fluid treatment apparatus 10.

The utilization of magnetic fields in practicing the present invention places material restrictions on some of the components. It is preferable in the present invention that the magnetic field intensification disks 500 and the magnetic field closure rings 600 include ferro-magnetic material. It is most preferable in practicing the preferred embodiment of the present invention as illustrated in FIGS. 1–8 that the magnetic field intensification disks 500 and the magnetic field closure rings 600 be made to include therein ferromagnetic material. It should be understood that other embodiments of the present invention could utilize different elements or even different means for accomplishing that practiced in the present preferred embodiment. For example, the magnetic field intensification disks 500 could be replaced by any device that would effectively dispurse and intensify magnetic fields of like polarity placed adjacent to one another. Similarly, the magnetic field closure rings 600 utilized in the preferred embodiment of the present invention could be replaced by a device that concentrates the magnetic field at an extremity of a magnet. It is obvious that other devices and means for accomplishing the requirements associated with the present invention can be used. Also, the other structural components of the present invention, e.g., the support cylinders 200, the support rings 300 and 320, the exterior structure 100, are preferably fabricated from stainless steel. However, any suitable support material adaptable to the required environment would be acceptable, for example, plastic, brass or the like.

The support cylinders 200 have upper flow distribution holes 210 and lower distribution holes 220. The upper flow distribution holes 210 and the lower distribution holes 220 are oriented to open at symmetrically opposite sides of the support cylinder 200. In addition, the respective upper flow distribution holes 210 of each support cylinder 200 are oriented to open at symmetrically opposite locations. Likewise, the lower flow distribution holes 220 are oriented to open at symmetrically opposite locations.

Figure 3:
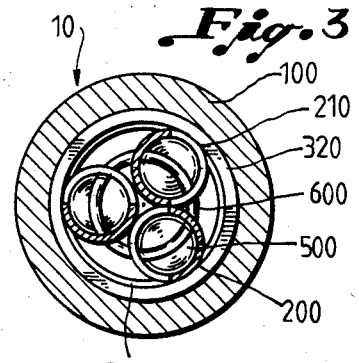
FIG. 3 is a cross-sectional view taken along the section line 3—3 in FIG. 1, illustrating the orientation of the flow distribution holes, the top magnetic field-closure ring, and the top magnetic field intensification disk.

FIG. 3 is a cross-sectional view taken along section line 3—3 in FIG. 1 illustrating the orientation of the upper flow distribution holes 210, the magnetic field closure ring 600, and the magnetic field intensification disks 500. The exterior structure 100 encases the inner components of the control apparatus 10. Adjacent to the exterior structure 100 is the lower support ring 320. Inside the lower support ring 320 are the support cylinders 200. The upper flow distribution holes 210 are illustrated in FIG. 3 by the non-hatched section of the support cylinders 200. The hatched sections of the support cylinder 200 are the upper ends 202 of the support cylinder 200. Interior of each support cylinder 200 is shown the uppermost magnetic field intensification disk 500. Below the magnetic field intensification disk 500 are the plurality of permanent magnets 400 (not visible in FIG. 3) and the other magnetic field intensification disks 500. The magnetic field closure ring 600 is shown passing through the support cylinders 200 and engaging the magnetic field intensification disks 500 for supporting the plurality of permanent magnets 400 and the associated magnetic field intensification disks 500.

Figure 4:
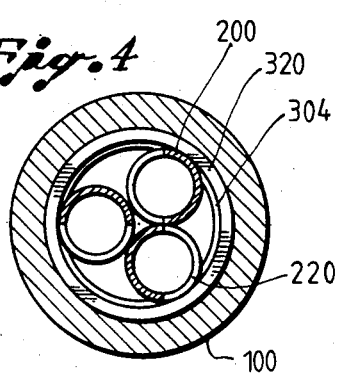
FIG. 4 is a cross-sectional view taken along the section line 4—4 in FIG. 1, illustrating the orientation of the bottom flow distribution holes, the support cylinders, and the bottom support ring.

FIG. 4 is a cross-sectional view taken along section line 4—4 of FIG. 1 illustrating the orientation of the lower flow distribution holes 220. The exterior structure 100 encompasses and abuts the lower support ring 320. Secured by, and interior of, the lower support ring 320 are the support cylinders 200. The lower end 204 of the support cylinders 200 are illustrated by the hatched area. The lower flow distribution holes 220 in the support cylinders 200 are illustrated by non-hatched areas.

As illustrated in FIG. 3 and FIG. 4, the orientation of the upper flow distribution holes 210 and the lower flow distribution holes 220 are at opposite sides of the same support cylinder 200. The orientation of the respective upper flow distribution holes 210 is illustrated in FIG. 3. The orientation of the upper flow distribution holes 210 provides that fluid passing therethrough would exit the support cylinders 200 at symmetrically opposite angles. Similarly, the lower flow distribution holes 220, as viewed in FIG. 4, are oriented to open at symmetrically opposing sides.

The orientation of the upper flow distribution holes 210 and the lower flow distribution holes 220 causes a fluid to have a swirling motion as the fluid passes through the support cylinders 200 specifically and through the fluid treatment apparatus 10 generally.

Figure 5:
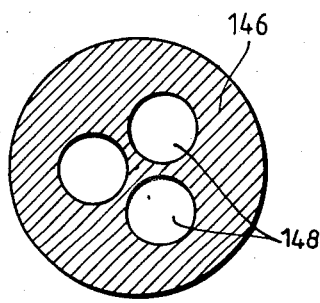
FIG. 5 is a cross-sectional view taken along section line 5—5 in FIG. 1, illustrating the turbulent flow generating structure.

FIG. 5 is a cross-sectional view taken along section line 5—5 in FIG. 1 illustrating a means for generating turbulent flow in the bottom chamber 140 as the fluid enters the control apparatus 10. The bottom chamber 140 has a turbulent flow segment 146. The turbulent flow segment 146 comprises one or more turbulent flow generating holes 148 bored in the bottom chamber 140.

The preferred embodiment of the turbulent flow generating holes 148 is a cylindrical aperture bored in the bottom chamber 140.

Fluid entering the bottom chamber 140 impinges on the turbulent flow segment 146 and passes through the turbulent flow generating holes 148. The impingement of the fluid upon the turbulent flow segment 146 and the movement of the fluid through the turbulent flow generating holes 148 induces the flow of the fluid to be turbulent.

FIG. 6 is a perspective sectional view illustrating the orientation of the support cylinder 200 and the upper support ring 300. The support cylinder 200 is adjacent the interior wall 302 of the upper support ring 300. The support cylinder 200 is restricted from vertical movement by abutting the lip 304 in the upper support ring 300. The upper and lower support rings 300 and 320, respectively, provide a stand-off distance 310 between the support cylinder 200 and the exterior structure 100. The stand-off distance 310 aids to maintain the effectiveness of the permanent magnets 400. The lower support ring 320 provides similar support and an equal stand-off distance 310 as described for the upper support ring 300.

FIG. 7 is a sectional, perspective view of the present invention illustrating the orientation of the support cylinders 200, the magnetic field intensification disks 500, and the magnetic field closure ring 600. The upper flow distribution holes 210 in the support cylinders 200 are illustrated in FIG. 7 to be symmetrically oriented to impart to the fluid a swirling motion. The magnetic field closure ring 600 is shown passing through the support cylinders 200 and engaging the upper surface 502 of the magnetic field intensification disks 500. The magnets 400 (not shown) abut the lower surface 504 of the magnetic field intensification disks 500.

FIG. 8 illustrates a plan view and an elevation view of the magnetic field intensification disks 500. The magnetic field intensification disk 500 is a short, solid right circular cylinder.

To use the present invention, the fluid treatment apparatus 10 is inserted in a pipe string. The top connector 120 and the bottom chamber 140 engage the pipe string to rigidly fix the position of the fluid treatment apparatus 10. A fluid enters the control apparatus 10 through the bottom chamber 140. The fluid engages the turbulent flow segment 146 and passes through the turbulent flow generating holes 148, inducing the fluid to be turbulent. Any laminar flow characteristics are aborted due to the turbulent flow generated by the turbulent flow generating holes 148. The fluid passes through the lower flow distribution holes 220 into the support cylinders 200 and around the support cylinders 200. The lower flow distribution holes 220 cause the fluid to experience additional turbulence by generating a swirling motion due to the symmetrical orientation of the lower flow distribution holes 220.

As the fluid passes upward through the exterior structure 100, it is exposed to the intense magnetic fields generated by the permanent magnets 400. The permanent magnets 400 are preferred to be the strongest commercially available. The magnetic fields are intensified by the magnetic field intensification disks 500. The magnetic field causes the molecules making up the fluid to experience intra-molecular deformation vibrations. These vibrations are believed to inhibit the chemical reactions between ions as well as to inhibit the affinity of paraffin molecules to the walls of the production equipment. Exposing the fluid to the intense magnetic fields is believed to distort the affinity of oil for molecules or extremely small droplets of water and distort the affinity of water for molecules or extremely small droplets of oil, thus aiding in the reduction of emulsions.

The intra-molecular vibrations are believed to continue for a finite time before they naturally dissipate. The vibrations are believed to continue for a time sufficient to allow the fluid to reach its destination or to encounter another fluid treatment apparatus 10.

After the fluid passes through the magnetic fields generated by the permanent magnets 400, the portion of the fluid which entered the support cylinders 200 exits through the upper flow distribution holes 210. The upper flow distribution holes 210 cause the fluid to exit the support cylinders 200 with a swirling motion similar to but opposite in direction from the swirling motion induced by the lower flow distribution holes 220. Thereafter, the fluid is directed through the top connector 120, out of the control apparatus 10 and into the pipe string.

The control apparatus 10 subjects intense magnetic fields upon a turbulent fluid to cause intra-molecular vibrations. The life and effectiveness of the control apparatus 10 is significantly increased by the use of the magnetic field closure rings 600. The magnetic field closure rings 600 secure the support cylinders 200 and the magnets 400 and to decrease magnetic field leakage. The longevity of the device is also enhanced by the use of the magnetic field intensification disks 500. The magnetic field intensification disks 500 preserve the strength of each individual magnet 400. The magnetic field intensification disks 500 aid in closing the magnetic field between the support cylinders thus aiding in the preservation of the magnetic field strength.

The present invention provides a method for preventing and reducing the problems associated with emulsions and the build-up of paraffin, scale, salt encrustation and the like on the interior surface of a structure transferring a fluid. The method comprises inducing the turbulent flow of the fluid within the structure, subjecting the fluid to a plurality of magnetic fields and further inducing the turbulent flow of the fluid within the structure. Preferably, the method of the present invention induces the turbulent flow of the fluid by hydraulically tripping the fluid within the structure or by changing the direction of the flow of the fluid within the structure. It is also preferred that the plurality of magnetic fields to which the fluid is subjected should alternate in polarity. The method of the present invention further comprises intensifying the alternating magnetic fields by placing the like poles of permanent magnets adjacent to one another and inserting therebetween a ferromagnetic material. The present method further includes intensifying the magnetic field at the extremities thereof by using a ferromagnetic material. The ferromagnetic material is shaped to provide a concentration of the magnetic fields at the extremities.

Additional advantages and modification will readily occur to those skilled in the art. The invention in its broader aspects is therefore not limited to the specific details, representative apparatus, and the illustrative examples shown and described herein. Accordingly, departures may be made from the detail without departing from the spirit or scope of the disclosed general inventive concept.

What is claimed is:

1. A method for preventing and reducing the problems associated with emulsion and build-up of paraffin, scale, salt encrustation and the like on the surface of a structure transferring a fluid comprising:
   (a) inducing turbulent flow of the fluid within the structure;
   (b) subjecting the turbulently flowing fluid to a sequence of magnetic fields of alternating polarity by passing the turbulently flowing fluid in the vicinity of a plurality of discrete solid cylindrical magnets aligned linearly along the direction of fluid flow with like poles of adjacent magnets oriented adjacent to one another;
   (c) inserting a solid disk-like ferromagnetic element between the like poles of adjacent magnets to intensify the magnetic fields;
   (d) positioning a ferromagnetic member at each extremity of the linearly aligned magnets to close and intensify the magnetic fields at the extremities;
   (e) inducing further turbulent flow of the fluid as it flows in the vicinity of the magnets.

2. A method as defined in claim 1, wherein inducing turbulent flow comprises hydraulically tripping the fluid within the structure.

3. A method as defined in claim 1, wherein inducing turbulent flow comprises obstructing the flow of the fluid within the structure.

4. A method as defined in claim 1, wherein further inducing turbulent flow comprises changing the direction of the flow of the fluid within the structure.

5. An apparatus for preventing and reducing the problems associated with emulsions and the build-up of paraffin, scale salt encrustation and the like on the surface of a conduit transferring a fluid comprising:
   (a) a housing having a first end and a second end,
   (b) a chamber adaptable to the first and of said housing for accepting a fluid therethrough and having a hydraulic trip for inducing the turbulent flow of the fluid,
   (c) a connector adaptable to the second end of said housing for discharging the fluid therethrough,
   (d) one or more support structures disposed in said housing,
   (e) a plurality of discrete solid cylindrical magnets longitudinally disposed in said support structures, adjacent magnets oriented in each support structure and adjacent support structures having like polarity adjacent for effecting a plurality of magnetic fields having alternating polarity,
   (f) a solid disk-like ferromagnetic element disposed between adjacent poles of adjacent magnets in each support structure, and
   (g) a ferromagnetic magnetic field closure member disposed at each extremity of the longitudinally disposed magnets.

6. The fluid treatment apparatus as defined in claim 1 wherein said housing is cylindrical.

7. The fluid treatment apparatus as defined in claim 1 wherein said chamber is cylindrical.

8. The fluid treatment apparatus as defined in claim 1 wherein said connector is cylindrical.

9. The fluid treatment apparatus as defined in claim 1 wherein the hydraulic trip is positioned in said chamber in spaced relationship from the support structures and comprises a perforated surface upon which the fluid impinges.

10. The fluid treatment apparatus as defined in claim 1 wherein said support structures are abutting and parallel right circular cylinders each having first and second ends, and defining a first aperture in the cylinder wall near the first end and a second aperture in the cylinder wall near the second end, the first aperture and the second aperture of each cylinder being on opposite sides of the wall of said cylinder, said cylinder aligned to have the first aperture of each cylinder to open symmetrically away from any adjacent first aperture for causing the fluids to enter said cylinders having a swirling motion and to have the second aperture of each cylinder to open symmetrically away from any adjacent second aperture for causing the fluid to exit said cylinders having a swirling motion.

11. The fluid treatment apparatus as defined in claim 1 wherein said ferromagnetic magnetic field closure member is toroidal in shape, and engages said support structures for securing the position of said support structures, said magnets and said ferromagnetic elements therein.

12. A fluid treatment apparatus for placement in a structure transferring a fluid for preventing and reducing the problems associated with emulsion and the build-up of paraffin, scale, salt encrustation, and the like on the surface of the structure comprising:
(a) means for inducing the turbulent flow of the fluid as the fluid enters the apparatus;
(b) a plurality of discrete solid cylindrical magnets aligned linearly along the direction of fluid flow with like poles of adjacent magnets oriented adjacent to one another to form a sequence of magnetic fields of alternating polarity;
(c) a solid disk-like ferromagnetic element inserted between the like poles of adjacent magnets for intensifying the magnetic fields;
(d) means for inducing further turbulent flow of the fluid as it flows in the vicinity of the magnets; and
(e) a ferromagnetic field closure member disposed at each extremity of the longitudinally disposed magnets.

13. The fluid treatment apparatus as defined in claim 12, wherein said means for inducing turbulent flow comprises an obstruction secured to the surface of the structure and extending into the path of the fluid.

14. The fluid treatment apparatus as defined in claim 12, wherein said means for inducing turbulent flow comprises a hydraulic trip operationally associated with the structure.

15. The fluid treatment apparatus as defined in claim 12, wherein said means for inducing turbulent flow comprises a member engaged with, and fixedly secured to, the surface of the structure, said member being oriented essentially perpendicular to the flow of the fluid and having one or more apertures therethrough for the passage of the fluid.

16. The fluid treatment apparatus as defined in claim 12, wherein the means for inducing further the turbulent flow of the fluid within the structure comprises a first device for changing the direction of the fluid, a second device for transferring the fluid linearly and a third device for again changing the direction of the fluid.

17. The fluid treatment apparatus as defined in claim 12, wherein the means for inducing further the turbulent flow of the fluid within the structure comprises a device for sequentially alternating the direction of the fluid.

18. The fluid treatment apparatus as defined in claim 12, wherein the means for inducing further the turbulent flow of the fluid within the structure comprises a plurality of cylinders having parallel central axes and abutting exterior walls, each cylinder having a first end, a second end, and defining a first aperture in the cylinder wall near the first end and a second aperture in the cylinder wall near the second end, the first aperture and the second aperture of each cylinder being on opposite sides of said cylinder, said cylinders aligned to have the first aperture of each cylinder to open symmetrically away from any adjacent first aperture for causing the fluid to enter said cylinders having a swirling motion and to have the second aperture of each cylinder to open symmetrically away from any adjacent second aperture for causing the fluid to exit said cylinders having swirling motion.

19. The fluid treatment apparatus as defined in claim 12 wherein said ferromagnetic magnetic field closure member is toroidal in shape.

20. An apparatus for preventing and reducing the problems associated with emulsions and the build-up of paraffin, scale, salt encrustation and the like on the surface of a conduit transferring a fluid comprising:
(a) a housing having a first end and a second end,
(b) a chamber adaptable to the first end of said housing for accepting a fluid therethrough and having a hydraulic trip for inducing the turbulent flow of the fluid,
(c) a connector adaptable to the second end of said housing for discharging the fluid therethrough,
(d) one or more support structures disposed in said housing, the support structures being abutting and parallel right circular cylinders each having first and second ends, and defining a first aperture in the cylinder wall near the first end and a second aperture in the cylinder wall near the second end, the first aperture and the second aperture of each cylinder being on opposite sides of the wall of said cylinder, said cylinder aligned to have the first aperture of each cylinder to open symmetrically away from any adjacent first aperture for causing the fluids to enter said cylinders having a swirling motion and to have the second aperture of each cylinder to open symmetrically away from any adjacent second aperture for causing the fluid to exit said cylinders having a swirling motion,
(e) a plurality of discrete magnets longitudinally disposed in said support structures, adjacent magnets oriented in each support structure and adjacent support structures having like plurality adjacent for effecting a plurality of magnetic fields having alternating polarity,
(f) a ferromagnetic element disposed between adjacent poles of adjacent magnets in each support structure, and
(g) a ferromagnetic magnetic field closure member disposed at each extremity of the longitudinally disposed magnets.

21. An apparatus for preventing and reducing the problems associated with emulsions and the build-up of paraffin, scale, salt encrustation and the like on the surface of a conduit transferring a fluid comprising:
(a) a housing having a first end and a second end,
(b) a chamber adaptable to the first end of said housing for accepting a fluid therethrough and having a hydraulic trip for inducing the turbulent flow of the fluid,
(c) a connector adaptable to the second end of said housing for discharging the fluid therethrough,
(d) one or more support structures disposed in said housing, (e) a plurality of discrete magnets longitudinally disposed in said support structures, adjacent magnets oriented in each support structure and adjacent support structures having like plurality adjacent for effecting a plurality of magnetic fields having alternating polarity, (f) a ferromagnetic element disposed between adjacent poles of adjacent magnets in each support structure, and (g) a toroidal ferromagnetic magnetic field closure member disposed at each extremity of the longitudinally disposed magnets, each closure member engaging said support structures for securing the position of said support structures, said magnets and said ferromagnetic elements therein.

22. A fluid treatment apparatus for placement in a structure transferring a fluid for preventing and reducing the problems associated with emulsion and the build-up of paraffin, scale, salt encrustation, and the like on the surface of the structure comprising:

(a) means for inducing the turbulent flow of the fluid as the fluid enters the apparatus, (b) a plurality of cylinders having parallel central axes and abutting exterior walls, each cylinder having a first end, a second end, and defining a first aperture in the cylinder wall near the first end and a second aperture in the cylinder wall near the second end, the first aperture and the second aperture of each cylinder being on opposite sides of said cylinder, said cylinders aligned to have the first aperture of each cylinder to open symmetrically away from any adjacent first aperture for causing the fluid to enter said cylinders having a swirling motion and to have the second aperture of each cylinder to open symmetrically away from any adjacent second aperture for causing the fluid to exit said cylinders having swirling motion, (c) a plurality of discrete magnets linearly aligned in each cylinder along the direction of fluid flow with like poles of adjacent magnets oriented adjacent to one another to form a sequence of magnetic fields of alternating polarity, (d) a ferromagnetic element inserted between the like poles of adjacent magnets for intensifying the magnetic fields, (e) means for inducing further turbulent flow of the fluid as it flows in the vicinity of the magnets.

* * * * *